Nov. 10, 1925.
J. I. BODINE
BICYCLE SUPPORT
Filed Feb. 11, 1924
1,560,892
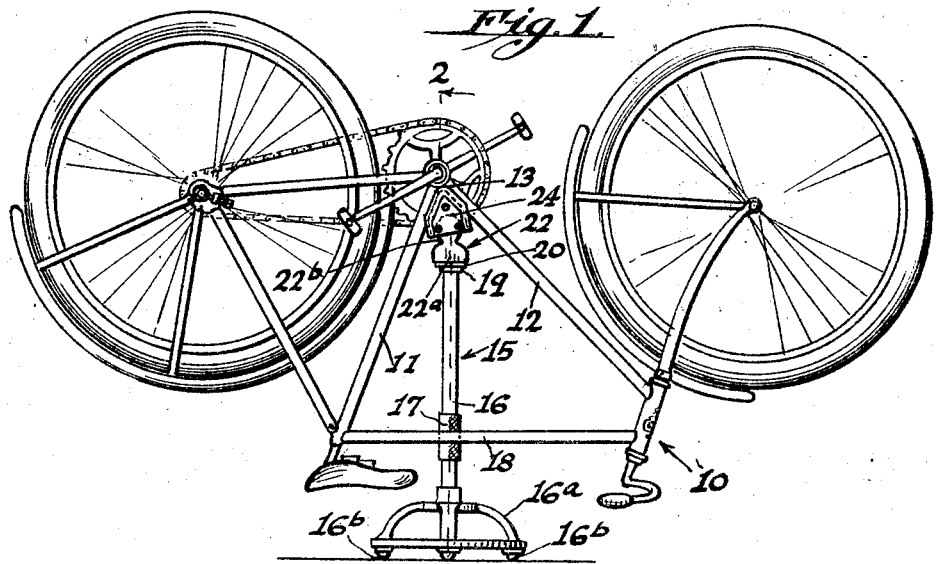
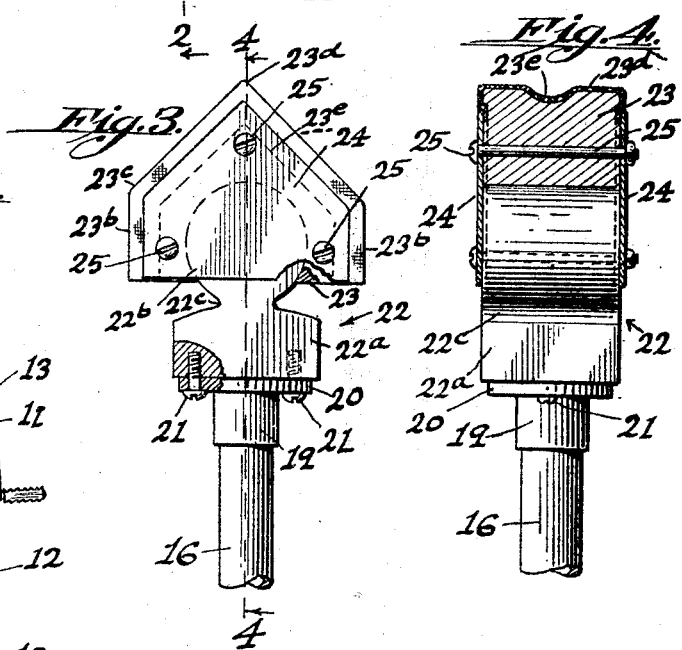
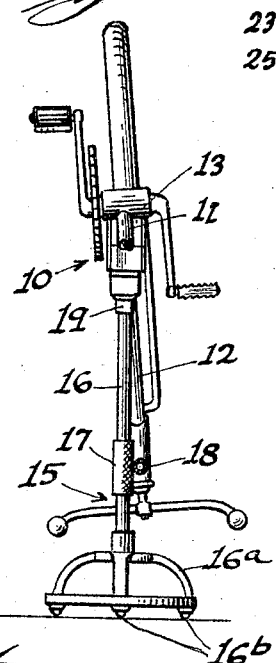
Inventor
James I. Bodine
By Hazard and Miller
Attorneys Patented Nov. 10, 1925.

1,560,892

UNITED STATES PATENT OFFICE.

JAMES I. BODINE, OF SEAL BEACH, CALIFORNIA.

BICYCLE SUPPORT.

Application filed February 11, 1924. Serial No. 692,052.

*To all whom it may concern:*

Be it known that I, JAMES I. BODINE, a citizen of the United States, residing at Seal Beach, in the county of Orange and State of California, have invented new and useful Improvements in Bicycle Supports, of which the following is a specification.

This invention relates to bicycle supporters and is useful in supporting a bicycle in inverted position when repairing the same.

An object of this invention is the provision of a bicycle supporter adapted to hold a bicycle by its frame.

Another object of this invention is the provision of a bicycle supporter in which an inverted bicycle may be tilted to various most suitable positions.

With the foregoing objects in view, together with such other objects and advantages as may subsequently appear, my invention consists in the construction and arrangement of parts hereinafter described and claimed and illustrated in the accompanying drawings, in which:—

Figure 1 is a side elevation of an inverted bicycle held by the supporter,

Fig. 2 is a view taken on line 2—2 of Fig. 1,

Fig. 3 is an elevation, partly in section, of an upper portion of the supporter, and Fig. 4 is a section on line 4—4 of Fig. 3.

Referring to the drawings for a more detailed description thereof, the numeral 10 indicates a bicycle in inverted position and having the usual converging frame members 11 and 12 which converge to form a crotch 13. The bicycle is supported and held above the ground by a supporter 15, the top of which engages the crotch 13. The supporter 15 comprises a standard 16 having a substantial base 16$^a$ provided with casters or other rolling means 16$^b$ so that the supporter may be readily moved over a floor. The standard 16 is preferably provided with a piece of non-abrasive material 17, such, for example, as cloth, which encircles a portion of the standard and is provided so that the cross bar 18 of the bicycle may not be scratched in rubbing against the standard, which is preferably made of metal. The top of the standard 16 comprises a collar 19 having a flange 20 to which is secured by means of screws 21 a member 22.

The member 22 comprises a lower portion 22$^a$ which carries centrally on its upper portion a cylindrical part 22$^b$, the parts 22$^a$ and 22$^b$ being connected by a neck 22$^c$. The part 22$^b$ fits into an aperture in a block or member 23. The periphery of the aperture in the block or member 23 extends below the axis of the cylindrical part 22$^b$ and fits the periphery of the part 22$^b$ more or less closely.

It will be seen that by this construction the block or member 23 is secured to the cylindrical part 22$^b$ against removal by any pull upward on the block 23; the latter, however, may be made to rotate on the cylindrical part 22$^b$. In order to secure the block or member 23 to the part 22$^b$ against lateral movement, plates 24 are secured by means of bolts 25 to either side of the block or member 23, the plates abutting against the ends of the part 22$^b$, but slidable thereon.

The block 23 has vertical side portions 23$^b$ at the upper ends of which the block is triangularly shaped, the sides 23$^c$ of the triangle intersecting at 23$^d$ and are provided with grooves 23$^e$ which receive the frame members 11 and 12 of the bicycle when the latter is positioned on the block or member 23.

It will thus be seen that I have provided a supporter on which a bicycle may be supported in inverted position and that the bicycle may be tilted to various positions to facilitate repairing operations.

While I have herein described one form of my invention, modifications thereof may be devised without departing from the spirit thereof, and it is to be understood that such modifications come within the scope of this invention.

What is claimed is:

1. A bicycle supporter comprising a standard, a horizontally disposed cylindrical element mounted upon said standard, and a member adapted to support a bicycle by its frame in inverted position rotatably mounted upon said cylindrical element.

2. A bicycle supporter comprising a standard, a horizontally disposed cylindrical element mounted upon said standard, and a member adapted to support a bicycle by its frame in inverted position mounted upon said cylindrical element, said member being so mounted as to provide movement thereof about a horizontal axis, and to prevent removal from said element.

3. A bicycle supporter comprising a standard, a cylindrical-shaped member and a triangular-shaped member adapted to support a bicycle by its frame in inverted position, said cylindrical-shaped member and said triangular-shaped member being in engagement and rotatable relative to each other.

4. A bicycle supporter comprising a standard, a cylindrical-shaped member and a triangular-shaped member having grooves for the reception of frame members of a bicycle in inverted position, said cylindrical-shaped member and said triangular-shaped member being in engagement and rotatable relative to each other.

5. A bicycle supporter comprising a standard, rolling members at the bottom of the standard, a cylindrical-shaped member and a triangular-shaped member having grooves for the reception of frame members of a bicycle in inverted position, said cylindrical-shaped member and said triangular-shaped member being in engagement and rotatable relative to each other.

In testimony whereof I have signed my name to this specification.

JAMES I. BODINE.